UNITED STATES PATENT OFFICE 2,495,085

PREPARATION OF SULFENAMIDES

Glen Alliger, Akron, Ohio, assignor to The Firestone Tire & Rubber Company, Akron, Ohio, a corporation of Ohio No Drawing. Application September 7, 1946, Serial No. 695,545

11 Claims. (Cl. 260—306.6)

The present invention relates to the synthesis of sulfenamides by a two-step process. In the first step an aqueous suspension of a N-monochloro primary amine is prepared by reacting a primary amine with an aqueous solution of the hypochlorite of an alkali metal or an alkaline earth metal. The reaction is carried out at a low temperature. In the second step an aqueous solution of an alkali metal or alkaline earth metal mercaptide is mixed with the aqueous suspension of the N-monochloroamine resulting from the first step. Here again, a low temperature is used. In carrying out the process, a minimal amount of water is used so that only a small amount of the N-monochloro primary amine is in solution during the reaction with the sulfenamide, or the same end may be accomplished by salting out, etc.

N-mono-substituted sulfenamides have been prepared by treating a mixture of a mercaptan and a primary amine with an oxidizing agent. Temperatures below room temperature have been recommended for carrying out such a reaction (Carr U. S. 2,271,834). It has been proposed to produce unsubstituted sulfenamides by reacting a mercaptan with monochloroamine at 0 to 5° C. (Hanslick U. S. 2,261,024 and 2,271,834). British 377,730 says that sulfenamides can be produced by the reaction of N-halogen compounds of primary or secondary amines with mercaptans but describes only the reaction with secondary amines. It is known that the N-chloro derivatives of primary amines are much more unstable than those of the secondary amines and British 377,730 does not attempt to explain how a satisfactory yield can be obtained with an N-chloro derivative of a primary amine.

The most satisfactory method of obtaining an N-mono-chloro primary amine is to react the primary amine with the hypochlorite of an alkali metal or alkaline earth metal. Commercially the sodium salt will ordinarily be used. The N-monochloro primary amines are so unstable that appreciable loss occurs if the use of the product is delayed by any process of separation from the aqueous reaction medium. It has now been found that a satisfactory yield of N-mono-substituted sulfenamide can be obtained by reacting an aqueous suspension of N-monochloro primary amine so prepared with a mercaptide, provided the proper reaction conditions are maintained.

It is not only necessary to use a low temperature—e. g., a temperature below about 10° C.—but high solution concentrations must also be employed. For commercial operations temperatures within the range of about 10° C. to about —20° or —30° C. are satisfactory. The solution concentrations must be so high that no more than a minimal amount of the N-monochloro primary amine is in solution. In other words, the concentrations must be such that substantially all of the N-monochloro primary amine is precipitated from the aqueous medium as an oil or solid (depending upon its melting point and the temperature employed) so that the mercaptide reacts with the N-monochloro primary amine in an undissolved condition; i. e., as a solid or liquid and not in aqueous solution. The N-monochloro primary amine which is retained in solution decreases the yield of the sulfenamide. The yield is independent of the mercaptide employed.

The reaction by which the N-monochloro primary amine is obtained is reversible. It may be represented by the following equation:

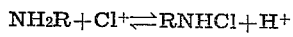

$$NH_2R + Cl^+ \rightleftharpoons RNHCl + H^+$$

Using an alkali metal or alkaline earth metal hypochlorite as the source of chlorine, the hydrogen ion concentration is low, and the N-monochloro primary amine is relatively insoluble. Salting out decreases the solubility but is expensive on a commercial scale. Commercially, the reaction is forced to the right by the use of low temperature and high concentrations, and the amount of the N-monochloro primary amine in solution is thus kept at a minimum.

Although sodium hypochlorite will ordinarily be used, other alkali metal and alkaline earth metal hypochlorites may be employed. Likewise, a hypobromite or hypoiodite might be employed although generally this is not commercially feasible.

The concentrations employed will depend on the solubility of the reactants and the temperature used. In general, a 1.5 to 3.5 molar concentration of the mercaptide and a 1.5 to 3 molar concentration of the hypochlorite will be found satisfactory although higher concentrations may be used. On mixing the two solutions, the resultant solution will be at least .75 molar with respect to each of the reactants or reaction products. Under proper conditions the mercaptide may be used in the undissolved state, or solutions of the mercaptide and N-monochloro primary amine in an organic solvent may be used. For instance, an ether extract of the N-monochloro primary amine obtained from the aqueous reaction mixture may be reacted with the mercaptide, such as an aqueous solution of the mercaptide, in which case the reaction appears to take place at the interface. However, for commercial operations such solvents are preferably avoided, and high molar solutions will give satisfactory yields provided a low temperature and high concentration are maintained.

Although equimolecular proportions of the reactants enter into the reaction, a slight excess of the primary amine—e. g., 10 to 20 per cent—is used to prevent the formation of N-dichloroamine. Larger excess of a volatile amine may be used, and the excess subsequently recovered by volatilization. However, this increases the cost of the operation and is to be avoided.

The primary amines which may be used in carrying out the reaction include, for example, cyclohexylamine, benzylamine, piperidine, ethylamine, n-amylamine, methylamine, n-butylamine, n-propylamine, isopropylamine, allylamine, ethylenediamine, hexahydrobenzylamine, etc.

Alkali metal and alkaline earth metal mercaptides which may be used in the process include, for example, those produced from the following mercaptans: thiophenol, thio-beta-naphthol, 2-mercaptothiazoline, 2-mercapto 4,5-dihydroglyoxaline, 2-mercaptobenzoxazole, 2-mercapto 4,5-dimethylthiazole, 2-mercapto-4-ethylthiazole, 2-mercaptobenzothiazole, 2-mercaptomethylbenzothiazole, 2 - mercaptochlorobenzothiazole, and N,N-diethyldithiocarbamic acid.

The following data illustrate the effect of lowering the temperature and increasing the concentration. Table I shows the effect of lowering the temperature. The amount of amine employed is somewhat in excess of that which will usually be employed commercially. The excess may be recovered by volatilization. It is not necessary to use such a large excess to prevent formation of the N-dichloroamine. The three reactions were carried out by the general procedure given in Example 1 which gives the exact conditions employed in carrying out the last of the runs collected in Table I in which a 98 per cent yield was obtained.

EXAMPLE 1

*N-isopropylbenzothiazyl sulfenamide*

To 180 grams (2 moles) of isopropylamine were added slowly and with stirring at a temperature of $-10°$ C. 1.5 moles of sodium hypochloride (in a 10 per cent solution). N-monochloroisopropylamine separated as a clear oil. To this mixture were immediately added 189 grams of sodium 2-mercaptobenzothiazole (333 milliliters of solution having a concentration of 3 moles per liter). The solid which separated was removed by filtration, washed and dried. The yield was 219 grams (98 per cent). The material melted at 89–93° C.

Table I shows the effect of the temperature used by comparing the yields obtained at three different temperatures under comparable conditions.

TABLE I

*Effect of temperature on the yield of N-isopropylbenzothiazyl sulfenamide*

| Gram Moles of Reactants | | | Temp., °C. | Per Cent Yield |
|---|---|---|---|---|
| Reactants for Formation of N-chloroamine | | Sodium 2-mercaptobenzothiazole | | |
| Sodium Hypochlorite | Isopropyl Amine | | | |
| 1.5 | 2.0 | 1.0 | 5 | 78 |
| 1.5 | 2.0 | 1.0 | 0 | 82 |
| 1.5 | 2.0 | 1.0 | −10 | 98 |

In Table II different runs are recorded in which the same general procedure as Example 1 was employed. They show that by increasing the concentration of the reactants, the yield is increased. Part II of Table II shows that high yields may be obtained at low temperatures using high concentrations even though no great excess of amine is employed.

TABLE II

*Effect of the concentration of reactants on the yield of N-isopropylbenzothiazyl sulfenamide*

| | Reactants for Formation of N-monochloroamine | | | Sodium 2-mercaptobenzothiazole | | Reaction Mixture Molar Conc. | Temp., °C. | Per Cent Yield |
|---|---|---|---|---|---|---|---|---|
| | Sodium Hypochlorite | | Isopropyl Amine, Moles | | | | | |
| | Moles | Molar Conc. | | Moles | Molar Conc. | | | |
| Part I | 1.5 | 1.3 | 2.0 | 1.0 | 3.0 | 0.70 | −10 | 90 |
| | 1.5 | 1.8 | 2.0 | 1.0 | 3.0 | 0.85 | −10 | 98 |
| Part II | 1.0 | 1.8 | 1.2 | 1.0 | 3.0 | 1.1 | −10 | 74 |
| | 1.0 | 2.5 | 1.2 | 1.0 | 3.0 | 1.3 | −10 | 89 |

EXAMPLE 2

*N-cyclohexyl-N',N'-diethylthiocarbamyl sulfenamide*

To 0.35 gram mole of cyclohexylamine was added slowly and with stirring 0.32 gram mole of sodium hypochlorite (177 milliliters of solution having a concentration of 1.8 moles per liter) at a temperature of 5–10° C. N-monochlorocyclohexylamine separated as a white crystalline solid suspended in the aqueous solution. A portion was filtered, washed thoroughly with ice water, and dried on a porous plate at 5–10° C. This was analyzed for available chlorine.

Calcd. for $C_6H_{12}NCl$, $Cl^+$, 26.53 per cent.

Found $Cl^+$, 26.93 per cent.

Thirty-two hundredths gram mole of N-monochlorocyclohexylamine was prepared as described above, and without separation from the reaction mixture and at a temperature of 5–10° C. there was added with stirring 0.30 gram mole of sodium N,N-diethyldithiocarbamate (150 milliliters of solution having a concentration of 2.0 moles per liter). The resulting mixture was stirred over night. The white solid was removed by filtration and dried. The yield was 59 grams (80 per cent). It melted 59–64° C.

The following tables show the effect of temperature and concentration on the yield.

TABLE III

*Effect of temperature on the yield of N-cyclohexyl-N',N',-diethylthiocarbamyl sulfenamide*

| Reactants for Formation of N-chloroamine | | | Sodium N', N'-diethyl-dithiocarbamate | | Temp., °C. | Per Cent Yield |
|---|---|---|---|---|---|---|
| Sodium Hypochlorite | | Cyclohexyl-amine, Moles | | | | |
| Moles | Molar Conc. | | Moles | Molar Conc. | | |
| 0.3 | 1.8 | 0.35 | 3.0 | 2.0 | 30–35 | 64 |
| 0.3 | 1.8 | 0.35 | 3.0 | 2.0 | 10–15 | 75 |

TABLE IV

*Effect of concentration of reactants and temperature of reaction on yield and purity of N-cyclohexyl-N',N'-diethylthiocarbamyl sulfenamide*

| Reactants for Formation of N-chloroamine | | | Sodium N', N'-diethyl-dithiocarbamate | | Temp., °C. | Per Cent Yield | M. P., °C. |
|---|---|---|---|---|---|---|---|
| Sodium hypo-chlorite | | Cyclohexyl Amine, Moles | | | | | |
| Moles | Molar Conc. | | Moles | Molar Conc. | | | |
| 0.30 | 1.26 | 0.35 | 0.30 | 1.0 | 30–35 | 51 | 55–64 |
| 0.32 | 1.80 | 0.35 | 0.30 | 2.0 | 5–10 | 80 | 59–64 |

EXAMPLE 3

*N-cyclohexyl-2-mercaptobenzothiazol sulfenamide*

To 40.5 ml. (0.35 mole) of cyclohexylamine was added 0.32 mole of sodium hypochlorite (179 milliliters of solution having a concentration of 0.1326 gram NaOCl per milliliter) slowly and with stirring at a temperature of about 10° C. The N-monochlorocyclohexylamine formed as a white solid suspended in the reaction mixture. To this suspension was then added again with stirring and at about 10° C. a solution of 50.1 grams (0.3 mole) of 2-mercaptobenzothiazole in an aqueous solution of 12.5 grams (0.30 mole) of sodium hydroxide, the whole solution of sodium mercaptobenzothiazole being made up to a volume of 150 ml. The fine white precipitate which formed was removed by filtration, washed thoroughly and dried. Yield: 68 grams or 86 per cent of the theoretical amount. The material melted at 98–101° C.

The following table shows the yield of several sulfenamides obtained by reaction with different mercaptides, using the conditions set forth in Example 2, and includes the yield and a comparison of the melting point obtained with the reference melting point of the literature.

TABLE V

*Sulfenamides from N-monochlorocyclohexylamine and various mercaptides*

| Mercaptide | Sulfenamide | Yield, Per Cent | M. P., °C. | Reference M. P., °C. |
|---|---|---|---|---|
| Sodium N,N-diethyldithiocarbamate | N,N-diethylthiocarbamyl-N'-cyclohexyl sulfenamide | 80 | 64.5–65.5 | 64–65 |
| Sodium-2-mercaptobenzothiazole | N-cyclohexylbenzothiazyl-sulfenamide | 86 | 98–101 | 102 |
| Sodium 4,5-dimethylthiazole | N-cyclohexyl-4,5-dimethyl-thiazyl sulfenamide | 82 | 93–94 | 92–94 |

The yields referred to in the foregoing and in the claims are based on the mercaptide employed.

As is evident from the foregoing, the invention is not limited to the disclosure but is defined in the appended claims. When the hypochlorite or mercaptide of an alkaline earth metal is employed, the calcium salt will generally be preferred to the barium, etc. Commercially, the sodium salt will ordinarily be employed although theoretically the hypochlorite or mercaptide of another alkali metal, such as potassium or lithium, may be used.

What I claim is:

1. The process of producing an N-mono substituted sulfenamide which comprises reacting a hypohalite of the class consisting of the alkali metal and alkaline earth metal hypohalites with a primary amine to produce an N-monochloro primary amine and mixing the resultant reaction mixture and a mercaptide of the class consisting of the alkali metal and alkaline earth metal mercaptides, using a minimal amount of water so that during the reaction with the mercaptide there is only a minimal quantity of the N-monochloro primary amine in aqueous solution, maintaining a temperature of not over about 10° C. throughout substantially the whole of both steps, and utilizing substantially equimolecular proportions of the reactants but with an excess of the primary amine to prevent formation of N-dichloro primary amine.

2. The process of producing an N-mono substituted sulfenamide which comprises reacting a hypohalite of the class consisting of the alkali metal and alkaline earth metal hypohalites with a primary amine and mixing the resultant reaction mixture and a mercaptide of the class consisting of the alkali metal and alkaline earth metal mercaptides, using water as a solvent and no other solvent, and using so little water as to have substantially the most possible of the N-monochloro primary amine produced by the hypohalite and amine in an undissolved state during the reaction with the mercaptide, maintaining a temperature of not over about 10° C. throughout substantially the whole of the reaction, and utilizing substantially equimolecular proportions of the reactants but with excess of the primary amine to prevent replacement of two hydrogens of the amine by chlorine.

3. The process of producing an N-mono substituted sulfenamide which comprises reacting a hypohalite of the class consisting of the alkali metal and alkaline earth metal hypohalites with a primary amine and mixing the resultant reaction mixture and a mercaptide of the class consisting of the alkali metal and alkaline earth metal mercaptides, using water as a solvent but using so little water for solution in the two steps of the process as to have only a minimal amount of the N-monochloro primary amine produced by the hypohalite and amine in aqueous solution during the reaction with the mercaptide, maintaining a temperature of not over about 10° C. throughout substantially the whole of the reaction, and utilizing substantially equimolecular proportions of the reactants but with excess of the primary amine to prevent replacement of two hydrogens of the amine by chlorine.

4. The method of producing an N-mono substituted sulfenamide which comprises reacting an aqueous solution of sodium hypochlorite with a primary amine, using an excess of the amine to produce N-monochloro primary amine, and without separation from the water mixing the resulting N-monochloro primary amine and a sodium mercaptide, carrying out substantially the whole of each step of the reaction at a temperature of about 10° C. to −30° C., using water and no other solvent and using no more water than required to produce a molar concentration of about 0.75 of the resulting N-mono substituted sulfenamide in the final aqueous reaction product.

5. The method of producing an N-mono substituted sulfenamide which comprises reacting an aqueous solution of sodium hypochlorite with a primary amine, using an excess of the amine to produce N-monochloro primary amine, and mixing a sodium mercaptide and the resulting reaction mixture, using no more water with the mercaptide prior to the reaction than to give in the resulting aqueous reaction mixture a molar concentration of the resulting N-mono substituted sulfenamide of at least about 0.75, and carrying out substantially the whole of both steps of the reaction at a temperature of not over about 10° C.

6. The process of producing an N-mono substituted sulfenamide which comprises reacting an aqueous solution of sodium hypochlorite of at least 1.5 molar concentration with a primary amine, using an excess of amine to prevent production of N-dichloro primary amine, without separation of water mixing the resulting N-monochloro primary amine and sodium mercaptide, maintaining a temperature below about 10° C. through substantially the whole of the reactions, using no other solvent than water and using no more water than required to produce a molar concentration of at least about 0.75 of the N-mono substituted sulfenamide.

7. The process of producing an N-mono substituted sulfenamide which comprises reacting a primary amine and a hypochlorite to produce an N-chloro primary amine and then mixing this and a mercaptide, the mercaptide and hypochlorite being of the classes consisting of the alkali metal and alkaline earth metal mercaptides and hypochlorites, respectively, using the hypochlorite as an aqueous solution and carrying out the reaction of the chloroamine and mercaptide in the presence of an aqueous solution of a reaction product containing a metal compound produced by the reaction of the amine and hypochlorite, but using so little water as to have only minimal quantity of the chloroamine in solution therein during the reaction with the mercaptide, and carrying out substantially the whole of both steps of the reaction at a temperature which is not above about 10° C.

8. The process of producing an N-mono substituted sulfenamide which comprises reacting an aqueous solution of sodium hypochlorite and a primary amine to produce a suspension of an N-chloro primary amine in an aqueous solution which contains a sodium compound in solution, and mixing a sodium mercaptide and this suspension but using so little water for the solution as to have only a minimal amount of the N-chloro primary amine in solution in the aqueous solution, and carrying out substantially the whole of each step of the reaction at a temperature not above about 10° C.

9. The process of producing an N-mono substituted sulfenamide from a sodium mercaptide, a primary amine, and aqueous sodium hypochlorite, which comprises reacting the amine and hypochlorite and mixing the mercaptide and the resultant reacted mixture, utilizing substantially equimolecular proportions of the reactants, but maintaining sufficient excess primary amine in the reaction mixture to prevent replacement of two hydrogens of the amine with chlorine, maintaining a temperature of not over about 10° C. throughout substantially the whole of the reactions, using water as a solvent and no other solvent, and using no more water than necessary to produce a molar concentration of at least about 0.75 of the resulting N-mono substituted sulfenamide in the final reaction mixture.

10. The process of producing N-isopropylbenzothiazyl sulfenamide which comprises reacting an aqueous solution of sodium hypochlorite of at least about 1.5 molar concentration with isopropylamine, using sufficient amine to prevent production of N-dichloroisopropylamine, and mixing the resulting aqueous mixture and an aqueous solution of sodium mercaptobenzothiazole of at least about 1.5 molar concentration and maintaining a temperature of about 10° C. to about −30° C. throughout substantially the whole of the reactions.

11. The process of producing N-cyclohexylbenzothiazyl sulfenamide which comprises reacting an aqueous solution of sodium hypochlorite of at least about 1.5 molar concentration with cyclohexylamine, using sufficient amine to prevent production of N-dichlorocyclohexylamine, and mixing the resulting aqueous mixture and an aqueous solution of sodium mercaptobenzothiazole of at least about 1.5 molar concentration and maintaining a temperature of about 10° C. to about −30° C. throughout substantially the whole of the reactions.

GLEN ALLIGER.

REFERENCES CITED

The following references are of record in the file of this patent:

UNITED STATES PATENTS

| Number | Name | Date |
|---|---|---|
| 2,261,024 | Hanslick | June 22, 1939 |
| 2,268,467 | Ashworth | Dec. 30, 1941 |
| 2,417,989 | Moore et al. | Mar. 25, 1947 |
| 2,419,283 | Paul et al. | Apr. 22, 1947 |
| 2,421,352 | Paul et al. | May 27, 1947 |

Certificate of Correction

Patent No. 2,495,085                                       January 17, 1950

GLEN ALLIGER

It is hereby certified that errors appear in the printed specification of the above numbered patent requiring correction as follows:

Column 3, line 75, for "hypochloride" read *hypochlorite*; column 5, line 62, heading to Example 3, for "mercaptobenzothiazol" read *mercaptobenzothiazyl*;

and that the said Letters Patent should be read with these corrections therein that the same may conform to the record of the case in the Patent Office.

Signed and sealed this 15th day of August, A. D. 1950.

[SEAL]

THOMAS F. MURPHY,
*Assistant Commissioner of Patents.*